(12) United States Patent
Pascal et al.

(10) Patent No.: US 9,342,225 B2
(45) Date of Patent: *May 17, 2016

(54) SYSTEMS, DEVICES, OR METHODS FOR ACCESSING INFORMATION EMPLOYING A TUMBLER-STYLE GRAPHICAL USER INTERFACE

(71) Applicant: AT&T Mobility II LLC, Atlanta, GA (US)

(72) Inventors: Kristin Marie Pascal, Kirkland, WA (US); Andrew Evan Klonsky, Portland, OR (US); Matthew James Bailey, Seattle, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 198 days.

This patent is subject to a terminal disclaimer.

(21) Appl. No.: 14/271,022

(22) Filed: May 6, 2014

(65) Prior Publication Data

US 2014/0245170 A1    Aug. 28, 2014

Related U.S. Application Data

(63) Continuation of application No. 12/343,409, filed on Dec. 23, 2008, now Pat. No. 8,893,040.

(51) Int. Cl.
*G06F 3/048* (2013.01)
*G06F 3/0484* (2013.01)
*G06F 3/0482* (2013.01)
*H04M 1/725* (2006.01)

(52) U.S. Cl.
CPC .......... *G06F 3/04842* (2013.01); *G06F 3/0482* (2013.01); *H04M 1/72552* (2013.01)

(58) Field of Classification Search
CPC ...................................................... G06F 3/048
See application file for complete search history.

(56) References Cited

U.S. PATENT DOCUMENTS

| 5,880,731 | A  | 3/1999  | Liles     |
| 5,894,305 | A  | 4/1999  | Needham   |
| 6,177,931 | B1 | 1/2001  | Alexander |
| 6,434,604 | B1 | 8/2002  | Harada    |
| 7,086,005 | B1 | 8/2006  | Matsuda   |
| 7,124,164 | B1 | 10/2006 | Chemtob   |

(Continued)

FOREIGN PATENT DOCUMENTS

WO      2005067327 A1    7/2005

OTHER PUBLICATIONS

Kurlander, et al. "Comic Chat" Proceeding SIGGRAPH '96, Proceedings of the 23rd annual conference on Computer graphics and interactive techniques, Aug. 1996, 12 pages.

(Continued)

*Primary Examiner* — Peiyong Weng
(74) *Attorney, Agent, or Firm* — Amin, Turocy & Watson, LLP

(57) ABSTRACT

A tumbler-style graphical user interfaces (TSGUI) facilitates high context rapid selection of content objects from at least a plurality of tumbler components. Selection of content objects can relate to a path for a memory to access a related final information. The TSGUI can be employed in mobile computing devices, including telephonic mobile computing devices. In an embodiment, a TSGUI of a mobile device can facilitate access to content in relation to messaging applications native to the mobile device.

20 Claims, 10 Drawing Sheets

(56) References Cited

U.S. PATENT DOCUMENTS

| | | | |
|---|---|---|---|
| 7,218,943 | B2 | 5/2007 | Klassen |
| 7,343,561 | B1 | 3/2008 | Stochosky et al. |
| 7,386,799 | B1 | 6/2008 | Clanton |
| 7,392,288 | B2 | 6/2008 | Kanagawa |
| 7,421,690 | B2 | 9/2008 | Forstall |
| 2002/0054164 | A1 | 5/2002 | Uemura |
| 2003/0228909 | A1 | 12/2003 | Tanaka |
| 2004/0260756 | A1 | 12/2004 | Forstall |
| 2005/0004985 | A1 | 1/2005 | Stochosky |
| 2005/0004995 | A1 | 1/2005 | Stochosky |
| 2005/0273730 | A1 | 12/2005 | Card |
| 2006/0277271 | A1 | 12/2006 | Morse |
| 2007/0152979 | A1 | 7/2007 | Jobs |
| 2007/0156910 | A1 | 7/2007 | Christie |
| 2008/0034037 | A1 | 2/2008 | Ciudad |
| 2008/0034038 | A1 | 2/2008 | Ciudad |
| 2008/0034315 | A1 | 2/2008 | Langoulant |
| 2008/0055269 | A1 | 3/2008 | Lemay |
| 2008/0094368 | A1 | 4/2008 | Ording |
| 2008/0094369 | A1 | 4/2008 | Ganatra |
| 2008/0165148 | A1 | 7/2008 | Williamson |
| 2009/0234784 | A1 | 9/2009 | Buriano et al. |
| 2009/0327267 | A1 | 12/2009 | Wong et al. |

OTHER PUBLICATIONS

Wikipedia. "Microsoft Comic Chat", retrieved from [http://en.wikipedia.org/wiki/Microsoft_Comic_Chat] on Mar. 11, 2015, 3 pages.
http://www.slashphone.com/xumii-launches-first-social-address-book-for-mobile-phones-at-demofall-08-212021, Retrieved Feb. 20, 2009.
http://www.xumii.com/ Retrieved Feb. 20, 2009.
http://www.apple.com/macosx/features/ichat.html Retrieved Feb. 20, 2009.
http://www.apple.com/macosx/features/300.html#ichat Retrieved Feb. 20, 2009.
http://www.flickr.com/photos/rmohns/1752400601/ Retrieved Feb. 20, 2009.
http://en.wikipedia.org/wiki/Ichat Retrieved Feb. 20, 2009.
http://www.techcrunch.com/2007/08/15/most-useful-iphone-site-yet-meebo/ Retrieved Feb. 20, 2009.
http://www.appsafari.com/utilities/837/beejive-im/ Retrieved Feb. 20, 2009.
http://www.boygeniusreport.com/gallery/handsets/beejive-for-iphone/ Retrieved Feb. 20, 2009.
http://www.boygeniusreport.com/gallery/handsets/beejive-for-iphone/?pid=3076#picture_nav Retrieved Feb. 20, 2009.
http://www.ilounge.com/index.php/articles/comments/iphone-gems-the-best-instant-messaging-apps Retrieved Feb. 20, 2009.
http://www.iphonehacks.com/2007/08/iphone-mundu-im.html Retrieved Feb. 20, 2009.
http://www.iphonehacks.com/2007/07/iphone-trillian.html Retrieved Feb. 20, 2009.
http://www.group2call.com/ Retrieved Feb. 20, 2009.
http://www.appsafari.com/chat/1452/group2call Retrieved Feb. 20, 2009.
http://www.swaggle.mobi/sessions/new Retrieved Feb. 20, 2009.
http://twitter.com/ Retrieved Feb. 20, 2009.
http://www.sweetim.com/ Retrieved Feb. 20, 2009.
http://www.techcrunch.com/2006/09/27/a-look-at-eight-multi-person-sms-services/ Retrieved Feb. 20, 2009.
http://www.labnol.org/internet/google-sms-subscribe-rss-via-sms/4726/ Retrieved Feb. 20, 2009.
http://www.txtblaster.com/ Retrieved Feb. 20, 2009.
http://www.eztexting.com/ Retrieved Feb. 20, 2009.
http://in.content.mobile.yahoo.com/new/groups/tour3.html Retrieved Feb. 20, 2009.
http://www.sendgroupsms.com/ Retrieved Feb. 20, 2009.
http://www.jabber.org.au/ichat Retrieved Feb. 20, 2009.
http://www.mac.com/1/images/ichat_screeshot1_20051012.jpg Retrieved Feb. 20, 2009.
http://www.textually.org/textually/archives/2007/12/018249.htm Retrieved Feb. 20, 2009.
http://www.macupdate.com/info.php/id/24959 Retrieved Feb. 20, 2009.
http://news.cnet.com/8301-13579_3-9962739-37.html Retrieved Feb. 20, 2009.
http://modmyi.com/forums/new-skins-themes-launches/4610-sms-balloon-collection.html Retrieved Feb. 20, 2009.
http://farm2.static.flickr.com/1321/1352786329_808877273e_o.png Retrieved Feb. 20, 2009.
http://mooseyard.com/Jens/wp-content/uploads/2008/03/balloon-chat-ui-21-april-1997.png Retrieved Feb. 20, 2009.
http://www.dbug.org/publications/articles/ichat_1_review.shtml Retrieved Feb. 20, 2009.
http://iphone.cazisoft.com/?paged=11 Retrieved Feb. 20, 2009.
http://www.mysupergroups.com/tour Retrieved Feb. 20, 2009.
http://www.mysupergroups.com/faqs Retrieved Feb. 20, 2009.
http://www.cssplay.co.uk/menu/bubbles Retrieved Feb. 20, 2009.
http://www.openwave.com/us/news_room/press_releases/2002/20020319_opwv_mmsandsms_0319.htm. Retrieved Feb. 20, 2009.
www.3jam.com. Retrieved Feb. 20, 2009.
http://mashable.com/2007/09/20/virgin-mobile-3jam/. Retrieved Feb. 20, 2009.
http://news.cnet.com/8301-13580_3-9768707-39.html. Retrieved Feb. 20, 2009.
http://ajaxpatterns.org/Predictive_Fetch. Retrieved Feb. 20, 2009.
http://help.yahoo.com/tutorials/cg/mail/cg_chatadv2.html. Retrieved Feb. 20, 2009.
http://www.talkshoe.com/se/about/TSAbout.html. Retrieved Feb. 20, 2009.
http://en.wikipedia.org/wiki/Second_Life. Retrieved Feb. 20, 2009.
http://www.whyville.net/smmk/nice. Retrieved Feb. 20, 2009.
http://www.there.com/whatIsThere.html. Retrieved Feb. 20, 2009.
http://slfix.com/?p=658. Retrieved Feb. 20, 2009.
http://extratorrent.com/torrent/905198/Text+Message+to+TV+Screen+by+FireText.html. Retrieved Feb. 20, 2009.
http://mooseyard.com/Jens/2005106/little-boxes-of-words/. Retrieved Feb. 20, 2009.
http://www.testiphone.com/. Retrieved on Feb. 20, 2009. Cumulative citation.
http://www.tatango.com/tatango/details. Retrieved on Feb. 20, 2009.
http://www.smsgupshup.com/help. Retrieved on Feb. 20, 2009.
http://www.intomobile.com/2007/12/07/change-your-iphones-sms-text-message-bubbles-to-a-matte-finish-iphone-matte.html. Retrieved on Feb. 20, 2009. Cumulative citation.
http://www.youtube.com/watch?v=VDnzgvRh6Xk. Retrieved on Feb. 20, 2009. Cumulative citation.
http://www.eztext.com/. Retrieved on Feb. 20, 2009. Cumulative citation.
http://www.faculty.idc.ac.il/arik/IMRet-All.mov. Retrieved on Feb. 20, 2009. Cumulative citation.
http://www.iminent.com/default.aspx. Retrieved on Feb. 20, 2009. Cumulative citation.
http://www.youtube.com/watch?v=rliqNvybcR4. Retrieved on Feb. 20, 2009. Cumulative citation.
Office Action dated Jun. 7, 2011 for U.S. Appl. No. 12/343,409, 35 pages.
Office Action dated Sep. 28, 2011 for U.S. Appl. No. 12/343,409, 16 pages.
Office Action dated Apr. 9, 2013 for U.S. Appl. No. 12/343,409, 19 pages.
Office Action dated Sep. 13, 2013 for U.S. Appl. No. 12/343,409, 20 pages.

SYSTEMS, DEVICES, OR METHODS FOR ACCESSING INFORMATION EMPLOYING A TUMBLER-STYLE GRAPHICAL USER INTERFACE

CROSS-REFERENCE TO RELATED APPLICATIONS

This application is a continuation of, and claims the benefit of priority to, U.S. patent application Ser. No. 12/343,409, entitled "SYSTEMS, DEVICES, OR METHODS FOR ACCESSING INFORMATION EMPLOYING A TUMBLER-STYLE GRAPHICAL USER INTERFACE" and filed Dec. 23, 2008. The entirety of the aforementioned application is incorporated herein by reference.

BACKGROUND

Modern communication devices typically have mechanisms for participating in messaging service protocols such as text messaging by short messaging service (SMS), multimedia messaging service (MMS) instant messaging (IM) applications, IP messaging, email, and the like. Typically, each of these protocols remains a separate and distinct application on a user equipment. Further, many of these protocols employ distinct communications hardware backbones that are distinct and not supportive of cross protocol interactions. As a result, many communications on modern user equipment, commonly referred to as "texting" (which includes SMS, MMS, IM, IP messaging, email, voice snippets, emoticons, visual messaging, and many others), employ multiple protocols, numerous inboxes, outboxes, and commonly third party software applications to facilitate some level of simplifying and unifying the numerous communication avenues.

The negative impact of overlapping and cumbersome "texting" platforms (e.g., any combination of the numerous forms of text/video/voice communications other than a traditional voice phone call) on mobile devices has not gone without notice by device manufacturers, service providers, and third party application developers. Third party developers often are the most nimble and quickest to respond to attempts at fulfilling a long-felt need such as a unified messaging platform to support "texting". However, many of these third party developers have lacked access to aspects of the hardware and core software of the myriad devices, systems, and protocols for texting. As a result, many third party applications are not robust enough, broad enough, or implemented in an attractive manner and therefore fail to fulfill the long-felt needs of the masses.

Device manufacturers and service providers generally are not as nimble as smaller third party application developers and are more constrained in business decision making and rarely rush to put out product that is friendly to a competitor's product, service, or protocol. As a result, solutions for consumer's long-felt needs may go unfulfilled by device manufacturers and service providers despite these entities having better access to the subsystems and core engineering that would enable them to develop a more ideal system/device in a less competitive environment.

As mobile device technologies becomes more ubiquitous and begin merging with more traditional computer manufacture and development, products and services are appearing for mobile devices that blur the lines between mobile and traditional notions of non-mobile devices. Interestingly, many business practices have also adapted to the coalescing mobile computing environment. One result of this is more interaction between device manufacturers and service providers in development and standards setting environments. This is also true across competing platforms where the realization is that consumers will tend to gravitate to a less limiting provider where possible and feasible. Thus, to keep customers, making devices and services competitor-friendly has become almost a survival requirement.

The resulting more cooperative development environment is yielding improved services and devices for customers. One area of improvement that will be of great benefit to mobile device users is the move toward unification of messaging systems. There is clearly a desire and long-felt need to simplify and effectively coalesce the plurality of overlapping "texting" communications systems. This is also especially true in cross platform and cross provider conditions. Further, support of legacy devices will be well received by consumers.

One problematic aspect of traditional messaging environments on mobile devices is separate protocols for media rich and non-media rich messaging. For example, SMS can be used to send a text message while separately MMS can be used to send a photo. Moreover, even where some third party application has cobbled together systems for sending media rich content contemporaneously with non-media rich messages selection systems for choosing content can be cumbersome. In another aspect, traditional selection mechanisms employed on conventional non-mobile systems frequently rely on external hardware human interface devices, for example mice and keyboards. In a mobile environment these external systems can be difficult at best to employ. Further, where internal selection systems are employed (e.g., jog dials, touch screens, etc.) these systems have frequently not been optimized through a soft user interface to provide truly efficient selection systems for content available to the mobile device.

Of notable exception are some modern portable music systems that have started to address rapid content selection employing elegant human interface systems. However, even these systems generally only support "drill-down" selection techniques. These drill-down systems may be efficient in these particular devices because the menu levels traversed are limited in scope and generally well known to a user after only a short indoctrination period allowing nearly rote navigation. Selection of content in mobile device systems is an important consideration, and improving efficiency and transparency is highly desirable. Clearly there is still much room for improvement in mobile device environments for user access systems that can facilitate efficient and intuitive comprehension/location of user accessible content in the fast paced mobile messaging environment of the modern mobile device.

DETAILED DESCRIPTION

Figure 1:
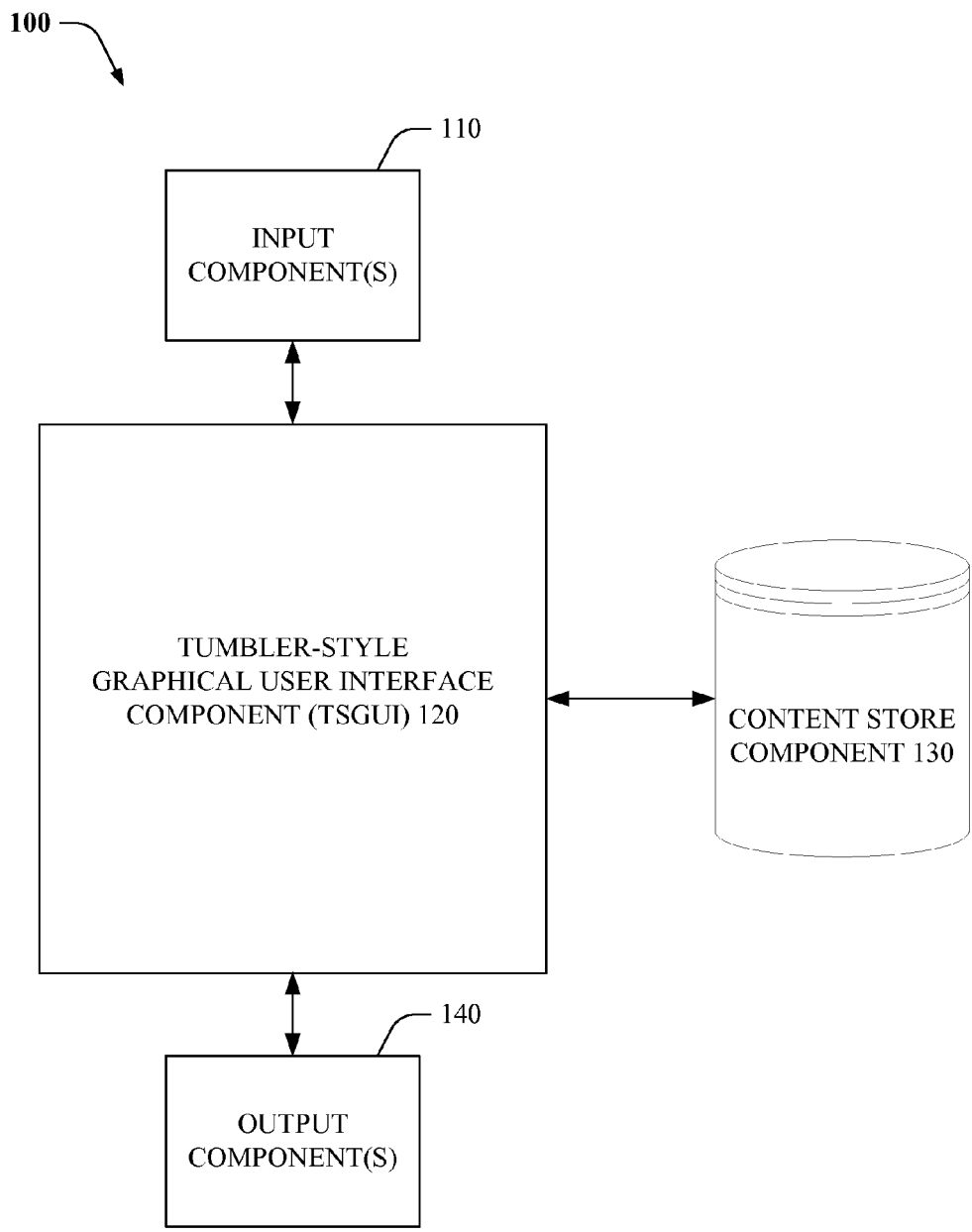
FIG. 1 illustrates an exemplary system that facilitates employing a tumbler-style graphical user interface (TSGUI) in accord with aspects of the claimed subject matter.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It will be appreciated by one of skill in the art that a communication network for systems described herein can include any suitable mobile and/or landline based circuit-switched communication network including a GSM network, a time division multiple access (TDMA) network, a CDMA network, such as IS-95 and subsequent iterations of CDMA technology, an integrated digital enhanced network (iDEN) network and a public switched transport network (PSTN). Further examples of a communication network can include any suitable data packet-switched or combination data packet/circuit-switched communication network, e.g., a wired or wireless internet protocol (IP) network such as a voice over internet protocol (VoIP) network, an IP data network, a universal mobile telecommunication system (UMTS) network, a general packet radio service (GPRS) network, and other communication networks that provide streaming data communication over IP and/or simultaneous voice and data communication over combination data packet/circuit-switched technologies.

Similarly, one of skill in the art will appreciate that a communication device for systems disclosed herein can include a mobile device, mobile phone, a PSTN phone, a cellular communication device, a cellular phone, a satellite communication device, a satellite phone, a VoIP phone, a WiFi phone, a dual-mode cellular/WiFi phone, a combination cellular/VoIP/WiFi/WiMAX phone or any suitable combination thereof. Specific examples of a mobile device can include cellular devices such as GSM, TDMA, CDMA, IS-95 and iDEN phones and cellular/WiFi devices such as dual-mode GSM, TDMA, IS-95 or iDEN/VoIP phones, UMTS phones UMTS VoIP phones, or like devices or combinations thereof. In support of mobile devices a gateway routing component of such a system can include any suitable component that can perform centralized routing within a mobile, satellite, or similar network (but optionally does not include components that route strictly within a PSTN network), routing between communication networks, between networks of varying architecture (e.g., between PSTN, GSM, UMTS, Enterprise VoIP, the Internet, or combinations thereof), or the like. Specific examples of a gateway routing component can include a GMSC, a gateway GPRS support node (GGSN), a session border control (SBC) device, or like devices. Additionally, a data storage component of such a system can include any suitable device, process, combination device and process, etc., that can store digital and/or switched information (e.g., server, database, data store, or the like).

Generally, tumbler components of a tumbler-style graphical user interface (TSGUI) can include one or more selectable features or content objects as disclosed herein. Content objects are analogous to the numbers on a tumbler of a mechanical combination lock. Much as the numbers on the mechanical tumbler can be selected by rotating them into an alignment or other position to indicate which number is being selected, the content objects of the TSGUI tumbler components can be selected. Diverging from the mechanical tumbler analogy, the TSGUI tumbler can include one or more content objects at each tumbler component. Further, these content objects can be of a plurality of types and can be ordered and/or sorted. Moreover, the number and type of content component can evolve dynamically. Thus, as available selections change, the content components of a tumbler component can reflect these changes. Further different from the analogous mechanical tumbler, a TSGUI tumbler component can be devoid of content components in a first state and become populated with content components in a second state.

Where a plurality of content objects are available for a given tumbler component, these can be selectively presented to the user. For example, a content object can be a file, a file folder, a category, a name, emoticon, service, protocol, drive, memory store, address, pointer, etc. (e.g., the content object is a selectable information that facilitates access to a final information and thus reasonably includes almost any computer entity capable of so affecting the probability of selecting a final information as directed by a user.)

To facilitate an efficient understanding of the disclosed subject matter, a plurality of tumbler components (e.g., analogs to a plurality of individual mechanical tumblers) can be described with various modifiers such as junior, senior, grandparent, etc. A junior can represent a finer grain selection than a related senior. However, this form of description can be onerous. Generally, discussions of tumblers as children, parents, etc., mirrors discussions of nodal logic. Where more complex discussions are given, an alternate nomenclature can be employed. For example, a junior tumbler component can be referred to as $T_n$, a senior as $T_{n-1}$, a grandparent as $T_{n-2}$, etc. Generally, the first tumbler component to be discussed will be given subscript "n" (or other variable) and subsequent tumbler components can be identified in relation to that subscript (e.g., more senior tumblers can be lower numbered and more junior tumblers can be higher numbered.) While this can be the preferred nomenclature employed herein, it is to be noted that other nomenclatures can be employed, and the local description of the relationships should be the default for determination of the disclosed subject matter.

Again, as used herein, a messaging environment can include "text" messages (e.g., short messaging service (SMS) messages, multimedia messaging system (MMS) messages, instant messaging (IM) type messages, IP messages, email messages, video snippets, voice snippets, web snippets, twitters, emoticons, etc.), more especially in a mobile device environment. Similarly a threaded messaging environment can be the same as or similar to a messaging environment and further include threading of messages (e.g., individual messages are threaded or strung together to provide additional context to the messages.) While the list of particular communications protocols herein is non-exhaustive, it is intended to convey that the connotation of "texting" incorporates messages of conversational length, including referenced media type objects, exclusive of pure traditional voice conversation as in a telephone call (e.g., a traditional telephone call is not "texting" but a SMS string that includes voice snippets can be considered "texting").

In accord with an aspect of the claimed subject matter, a predetermined number of tumbler components can be displayed to facilitate user selection of a final information. A final information can be accessed by selecting an information at each of the predetermined number of tumbler components. In a further aspect, the number of tumbler components presented for selection can be dynamic.

In another aspect, the parental context can also facilitate rapid alteration of selection information to select a final information. A user can easily navigate among the tumbler components to alter an information selection. Altering the parental selections can be by: a) Independent selection, b) Validity dependent selection, c) Inferential selection, d) Clearing Children, or other technique.

In a further aspect, TSGUI can include one or more selectable content objects. Where a plurality of content objects are available for a given tumbler component, these can be selectively presented to the user. Moreover, each content object can reflect relevant selectable information. Further, content object representations can be presented in a tumbler component so as to facilitate effective navigation and selection among a plurality of content objects. For example, horizontally arranged content objects can be scrolled through for selection within each tumbler component. Selection can be by alignment of a content object with one or more indicators. Traversing the content objects can be linear, cyclic, or by some other technique. One of skill in the art will appreciate that this brief disclosure of the various aspects of the subject disclosure is not intended to be limiting, that numerous other particular embodiments of the various aspects can be presented, and that all such permutations are to be considered within the scope of the present disclosure.

The claimed subject matter provides for systems, devices, and methods employing a tumbler-style graphical user interface (TSGUI) facilitating access to information. The TSGUI can be particularly useful in a mobile device where human interface modalities can be limited, e.g., limited display area, limited external hardware interfaces, etc. Further, the TSGUI can facilitate rapid selection of content for messaging applications, more especially unified messaging applications that are cross platform compatible (e.g., combining SMS, MMS, 1M, 1P messaging, email, and/or other messaging or "texting" protocols).

As used herein, a messaging environment can include "text" messages (e.g., short messaging service (SMS) messages, multimedia messaging system (MMS) messages, instant messaging (1M) type messages, IP messages, email messages, video snippets, voice snippets, web snippets, twitters, emoticons, etc.), more especially in a mobile device environment. Similarly a threaded messaging environment can be the same as or similar to a messaging environment and further include threading of messages (e.g., individual messages are threaded or strung together to provide additional context to the messages.) While the list of particular communications protocols herein is non-exhaustive, it is intended to convey that the connotation of "texting" incorporates messages of conversational length, including referenced media type objects, exclusive of pure traditional voice conversation as in a telephone call (e.g., a traditional telephone call is not "texting" but a SMS string that includes voice snippets can be considered "texting").

The term "tumbler style" relates to user interface elements that facilitate selection of information relating to a path to accessing a final information/object. These user interface elements can be tumbler components. These tumbler components can have strong parallels and be in an aspect analogous to a mechanical combination lock. In a mechanical combination lock the user selects elements of a combination with a set of mechanical tumblers, typically selecting a single combination element with each mechanical tumbler. Thus, in the mechanical combination lock analogy, a four tumbler mechanical combination lock would have a four number combination to unlock the mechanical combination lock. Analogously, each tumbler component can select an information that in combination would comprise a "combination" to access the final information indicated by the user.

In accord with an aspect of the claimed subject matter, a predetermined number of tumbler components can be displayed to facilitate user selection of a final information. A final information can be accessed by selecting an information at each of the predetermined number of tumbler components. Access to the final selection can include entry of information in fewer than all of the predetermined tumbler components presented when the final information can be accessed with a fewer number of tumbler component information selections. Additionally, compaction of senior tumbler components can free junior tumbler components where accessing a final information would include more information entries that the predetermined number of tumbler components provided.

In a further aspect, the number of tumbler components presented for selection can be dynamic. The dynamic presentation of additional tumbler components can present the user with only as many tumbler components as are needed to identify the final information sought. Where the number of presented tumbler components exceeds an allocation of display area, the tumbler components can be altered in appearance or scrolled to provide additional space for additional tumbler components where needed to continue identifying a final information.

In a related aspect, the presentation of a TSGUI includes two or more tumbler components. Further, a junior tumbler component typically allows selection of a subset of information related to information selections of senior tumbler components. Where at least two tumbler components are presented the user is provided with additional context related to selection of a final information in comparison to drill-down type systems. This context can include knowledge of more senior information selections comprising the final information selection. For example, where a senior tumbler component includes a selection of "Maui_1997_Vacation_Photos" and the junior tumbler component includes selection of a final information "Hanging_Ten.jpg", the user can comprehend that the Hanging Ten image is from the senior file of Hawaiian vacation photos from 1997 as compared to some other year or some other island chain. Other contextual benefits will be apparent to one of skill in the art.

In an aspect, the parental context can also facilitate rapid alteration of selection information to select a final information. A user can easily navigate among the tumbler components to alter an information selection. Altering the parental selections can be done independent of altering the junior selections, can be done independent of altering the junior selections dependant of the continuing validity of the junior selections, can be related to inferential alteration of junior selections, can be related to clearing one or more junior selections, or some combination thereof. Continuing the prior example, where a user alters the senior selection from "Maui_1997_Vacation_Photos" to "Honolulu_1997_Vacation_Photos":

a. Independent selection—The junior information selection can be left unaltered (e.g., altering the parental selection can be an independent action from altering a junior selection). Where "Hanging_Ten.jpg" does not exist for the altered parental selection a final information will not be selected (e.g., where Hanging_Ten doesn't exist in relation to Honolulu, Hanging_Ten cannot be selected although it may still be displayed in the tumbler in this particular embodiment.) This can be particularly useful, for example, when the user wants to alter a plurality of parental tumbler component selections before changes to the junior tumbler information are reflected for selection of a final information. In addition, where the same information is in fact valid under the new selection, the alteration of the senior selection can trigger selection of a new final information, in this example, where "Hanging_Ten.jpg" exists under both Maui and Honolulu, altering the senior tumbler selection to Honolulu results in selection of the picture Hanging_Ten under Honolulu rather than the picture of the same name under Maui. This can be the same or a different photo (e.g., there can be two different photos with the same name under different senior file folders, there can be the same photo stored in two different locations, there can be the same file referenced under two different senior folders, etc.)

b. Validity dependent selection—In contrast, to independent senior-junior selection relationships, a junior selection can be dependent on continuing validity in light of the alteration of the senior tumbler component selection. Thus, where "Hanging_Ten.jpg" is not valid under Honolulu, the selectable information in the junior tumbler component can be removed (grayed-out, shaded, or otherwise indicated as an invalid selection information in relation to the alteration of the senior tumbler component selection.) This is a highly intuitive embodiment in which a junior tumbler dynamically reflects alterations to parental tumbler component selections.

c. Inferential selection—Where parental tumbler component information selections are altered, the junior tumbler selections can be intelligently populated. This can be reflective of inferences related to the prior junior tumbler component selections. For example, "Hanging_Ten.jpg" may not be relevant under Honolulu, but metadata can indicate that it was a photo related to surfing such that when the senior is altered from Maui to Honolulu, the junior tumbler informations can be altered to intelligently reflect pre-selection of surfing pictures in the junior tumbler component.

d. Clearing Children—Where a senior tumbler selection is altered, one or more levels of junior tumbler selections can be cleared. Thus, for example, "Hanging_Ten.jpg", can be cleared when the senior selection is altered form Maui to Honolulu. In an alternate example, where a grandparent tumbler component for "Hanging_Ten.jpg", indicates "Vacations" and this tumbler selection is altered to "Work", both the senior tumbler component and junior tumbler can be cleared (e.g., both the tumbler including the selectable information "Hanging_Ten.jpg", and the tumbler component including the selectable information "Maui_1997_Vacation_Photos" can be cleared).

In a further aspect, TSGUI can include one or more selectable informations at each of the two or more tumbler components. These can generally be referred to as content objects. Where a plurality of content objects are available for a given tumbler component, these can be selectively presented to the user. For example, a content object can be a file, a file folder, a category, a name, emoticon, service, protocol, drive, memory store, address, pointer, etc. (e.g., the content object is a selectable information that facilitates access to a final information and thus reasonably includes almost any computer entity capable of so affecting the probability of selecting a final information as directed by a user.) For example, a content object can represent a categorical selectable information such as "music", "emoticons", "images", "places", etc. As another example, a content object can represent an object selectable information such as "C:\\", "http://", "MyDocuments", "dog.jpg", "Resume.doc", InstructionManual.pdf", etc. As yet a further example a content object can represent a selectable information such as a network name, a cellular service provider, a date range, database query, an web address or other internet or network address, a phone number, an thumbnail image, etc.

In connection with this aspect, each content object can reflect relevant selectable information. For example, where a selectable information can be "I want a little sugar in my bowl—Nina Simone.mp3", the content object can reflect the entire file name, a part of the file name, or some other reflection of the file. Thus, the content object for this exemplary file can be represented by:

a. "I want a little sugar in my bowl—Nina Simone.mp3"
   b. " . . . [S]ugar in my bowl . . . Nina Simone.mp3"
   c. "I want . . . sugar . . . bowl"
   d. "most played, Nina Simone"
   e. Etc.

Further, content object representations can be presented in a tumbler component so as to facilitate effective navigation and selection among a plurality of content objects. For example, the content objects can be listed horizontally in a tumbler component of a vertical arrangement of tumbler components. One of skill in the art will appreciate that numerous other arrangements are possible and that all such arrangements are within the scope of the present disclosure, for example, vertical alignment of content objects in a horizontal alignment of tumbler components, a grid arrangement of tumbler components each displaying a grid arrangement of content objects, nested tumbler components, etc. For convenience and compactness of disclosure, these alternate arrangements are not further discussed herein and the aspects of the subject matter disclosed herein can be applied to any or all of the other arrangements.

Horizontally (or otherwise) arranged content objects can be scrolled through for selection within each tumbler component. Selection can be by alignment of a content object with an indicator. This indicator can be aligned with similar indicators for other tumbler components. Returning to the analogous mechanical tumbler combination lock, each tumbler can rotate a content object into a line that represents a combination unlocking a final information selection. Other indicators for selection of a content component can be described and all such indicators are within the scope of the disclosure, for example, highlighting a content object without aligning the content object with other reference points, etc. These alternate selection indicators are not further discussed herein, but such discussion is herein reserved, for convenience and compactness of disclosure.

Traversing the content objects can be linear, e.g., objects can scroll left to right or right to left from a starting content object to an ending content object. Traversing can also be cyclic, wherein an end content object is followed in sequence by the starting content object. Ordering of the content objects can be alphabetical, temporal, by metadata, by classification, etc. These ordering sorts can also be combined and/or employed as filters. For example, objects can be ordered first by ascending name and then decreasing date such that Hanging_Ten_Mom.jpg taken June 2000 would come after Hanging_Ten.jpg but before Hanging_Ten_Mom.jpg taken May 2000. A further example can be alphabetically ordering content objects that are larger than 5 Mb. One of skill in the art will appreciate that other such ordering, sorting, and filtering can be employed and that all such techniques are within the scope of the current disclosure.

More specifically, FIG. 1 depicts an exemplary system 100 that facilitates employing a tumbler-style graphical user interface (TSGUI) in accord with aspects of the claimed subject matter. System 100 can include input component(s) 110. Input component(s) 110 can at least in part facilitate entry of input related to selecting a content object (not illustrated) of a tumbler component (not illustrated). Input component(s) 100 can be communicatively coupled to a tumbler-style graphical user interface component (TSGUIC) 120. TSGUIC 120 can be communicatively coupled to a content store component 130. Content store component 130 can include stored content. This content can be user accessible content.

TSGUIC 120 can facilitate user access to content of content store component 130. TSGUIC 120 can include two or more tumbler components (not illustrated) that can reflect access paths to content of content store component 130. Content of content store component 130 can be accessed by traversing a path to the accessible content. TSGUIC 120 can accept user selection of reflected paths by way of tumbler component content object selections (not illustrated). This can result in access of a final information of content store component 130. Information related to access of the final information can be presented by way of output component(s) 140 which can be communicatively coupled to TSGUIC 120.

In an aspect, input component(s) 110 can include any modality of input device or system that can facilitate a user selecting an information of TSGUIC 120. For example, input component(s) 110 can include, but is not limited to, a 5-way keypad, a jog dial, a touch screen, a keyboard, a key pad, a numerical key pad, a mousing interface, a voice interface, a touch pad, etc., or combinations thereof. For example, a user can use a rotary jog dial to traverse and/or select selectable informations (e.g., content objects, not illustrated) through the TSGUIC 120, reflecting, at least in part, a path to a final information of content store component 130.

The selection process undertaken by a user of system 100 can be reflected by output component(s) 140. For example, as the user selects one or more content objects (not illustrated) through TSGUIC 120 by employing input component(s) 110, the user traverses and/or user selects of content objects can be rendered on a display by way of output component(s) 140. Further, for example, where a user indicates access to a final information, the final information can be accessed of the content store component 130 for presentation on a display by way of output component(s) 140. This example is intended to be a particular non-limiting example illustrating one possible output component 140. However, the output component(s) 140 can include any one of a nearly limitless number of output components, for example, a display (LCD, CRT, etc.), a speaker, a video driver, a driver for a user interface, a projected display, a tactile user interface, or any other form of outputting information and/or content to a user. System 100 can support the other various aspects of a tumbler-style interface as disclosed herein. Moreover, various features related to TSGUIC 120 or similar components are also disclosed in more detail herein.

Figure 2:
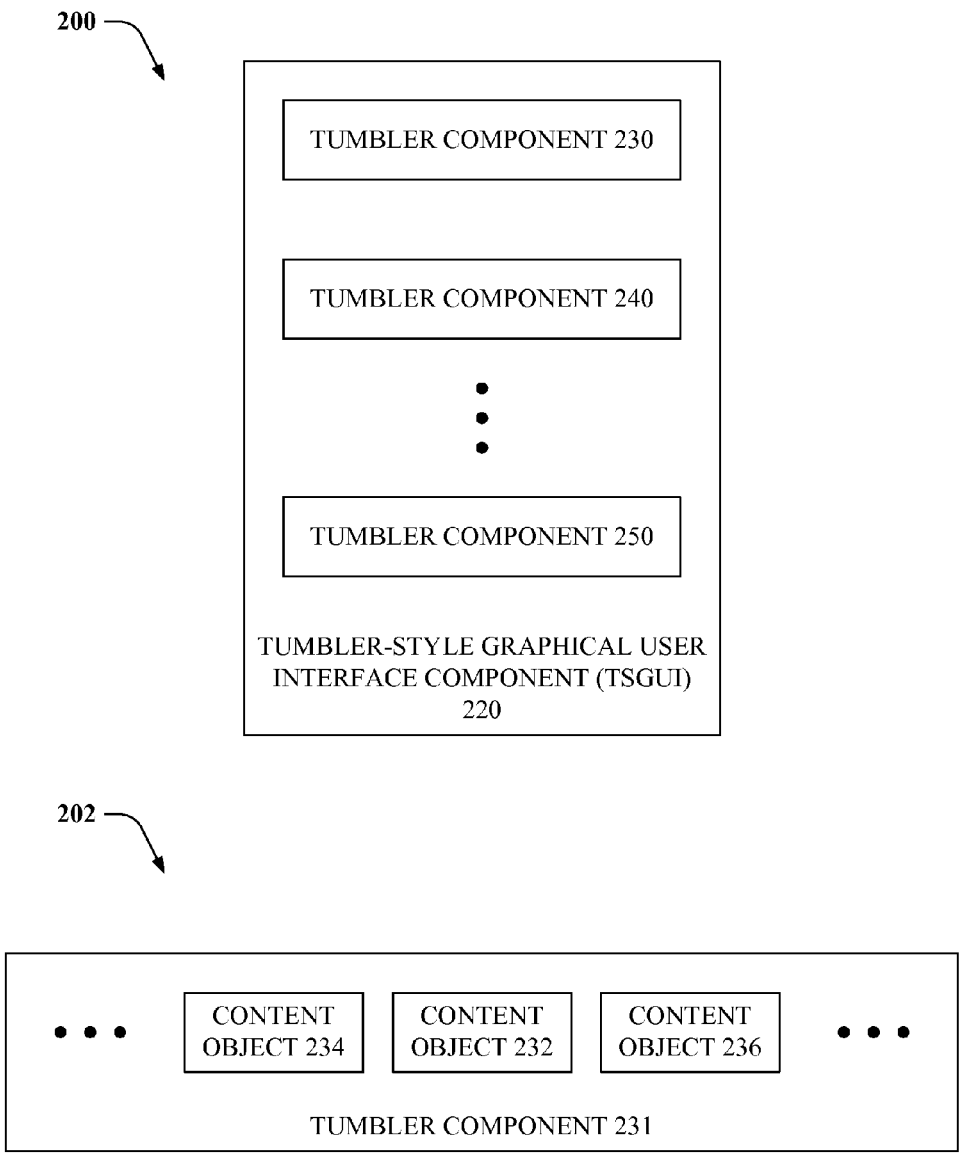
FIG. 2 depicts exemplary systems that facilitates employing a tumbler-style graphical user interface (TSGUI) in accord with aspects of the claimed subject matter.

FIG. 2 depicts exemplary systems 200 and 202 that can facilitate employing a tumbler-style graphical user interface (TSGUI) in accord with aspects of the claimed subject matter. System 200 can include TSGUIC 220 that can be the same as or similar to other TSGUICs herein, for example TSGUIC 120, among others. In an aspect, TSGUIC 220 can include two or more tumbler components, for example 230, 240 . . . 250.

Each tumbler component (230-250) can facilitate selection of an information. The selected informations can facilitate access to a final information. Tumbler component 230 can be a first tumbler component to facilitate entry of a first information. This information can be analogous to selecting a first number for a first mechanical tumbler of a mechanical combination lock. Similarly, tumbler component 240 can be a second tumbler component to facilitate entry of a second information. This second information can be analogous to selecting a second number for a second mechanical tumbler of a mechanical combination lock. This pattern can continue through tumbler component 250, wherein a terminal information can be entered. This terminal information can be a final information and/or can complete a path comprised of the portions of the prior tumbler component selections 230, 240, etc., leading to a final information. A terminal information can be analogous to entering a last number for a last mechanical tumbler in a mechanical combination lock such that the combination for the lock is complete and can be opened. Unlike the analogous combination lock with just one correct combination sequence access the mechanical tumblers, there can be many particular "combinations" selected across the plurality of tumble components 230-250.

Drawing on the analogy to a series of mechanical tumblers, the tumbler components 230-250 can each contain a plurality of informations that can be traversed and/or selected. For example, in the analogical lock, each tumbler can have the numerals 0-9, and a user can rotate through the numerals and/or select one of the numerals. Similar analogies can be made to mechanical tumblers with symbols, glyphs, textual representations and the like.

Unlike the analogical examples, the tumbler components 230-250 can each have one or more informations (e.g., content objects 232, 234, 236 of tumbler 231 of system 202) and the number of informations can be static or dynamic. By way of example, tumbler component 230 can always have, for example, three content objects (e.g., same as or similar to content objects 232-236), for instance, "music", "photos", and "videos". This can facilitate the user traversing/selecting from the content objects. As another example, tumbler component 240 can have a dynamic number of content objects (e.g., same as or similar to content objects 232-236), for example reflecting a subset of information related to the selected content object of tumbler 230. For instance, if tumbler component 230 indicates "music" by selection of the music content object, tumbler component 240 can indicate musical genera stored on memory (e.g., a musical genus at each content object of tumbler 240). The number of musical genus content objects can vary and this variation can be reflected in the manner in which tumbler 240 is populated with content objects (e.g., same as or similar to content objects 232-236). As a further expansion of the example, additional tumbler components having one or more content objects each can be presented for user selection of informations from subsets of the prior selections. Thus at tumbler component 250, for example, song titles can be presented for a particular selected musical genus. Each song title at tumbler component 250 can be populated as a content object that can be the same as or similar to content objects 232-236. A final information can be selected from these content objects and can facilitate the user accessing, in this particular example, the indicated song of the particular musical genus from memory also containing video and photos.

As previously disclosed, the number of tumbler components 230-250 can be based on a predetermined number, or can be dynamic in number. A static number of tumbler components can be analogous to a mechanical combination lock that employs a constant number of mechanical tumblers (e.g., tumblers are traversed or remain in a default state but the number of tumblers is static). Thus for example, there can always be, for example, four tumbler components 230-250. Static tumbler component counts can be useful where a user desired final information is always definable with the predetermined tumbler count. For example, where the TSGUIC 220 is employed in an mp3 player and a song selection (e.g., a final information) can always be determined by "genera→artist→album→song", four tumblers is sufficient and is functional even though the number of tumblers is static at four tumblers.

In contrast to common mechanical combination locks, the TSGUIC 220 can employ a dynamic number of tumbler components 230-250. Thus, for example, where a user can need 2 tumblers to access some content but need 15 tumblers to access other content, the number of tumblers presented can be dynamically expanded or retracted as needed to achieve selecting a final information.

The count of tumbler components 230-250 employed to select a final information can be displayed in a high context manner. That is, at least a plurality of the tumbler components (for either a static or dynamic number of tumbler components) can be displayed or otherwise presented to a user. This provides context for the user in that the user can be aware of the selections for each of the presented tumbler components. In an example, where four tumbler components are employed, all four tumbler components can be presented to the user such that the user is aware of the selected content object of each of the four tumblers. For instance, the tumbler component content objects selected can reflect: "Jazz→Louis_Armstrong→Hello_Dolly→Hello_Dolly", this allows the user to understand that the particular final information (e.g., the song Hello Dolly) is from the Louis Armstrong album Hello Dolly of the Jazz genus of a content store. This high context schema provides additional content information over more conventional drill down systems and in a different manner than more conventional tree or node-type diagrams. Where there are more tumbler components than can be effectively displayed, some tumbler components can be compacted to reflect context more efficiently, tumblers can be scrolled off-display, etc., so long as at least a plurality of tumbler components remain presented to the user to provide the higher level of context over more conventional drill-down schema.

Figure 3:
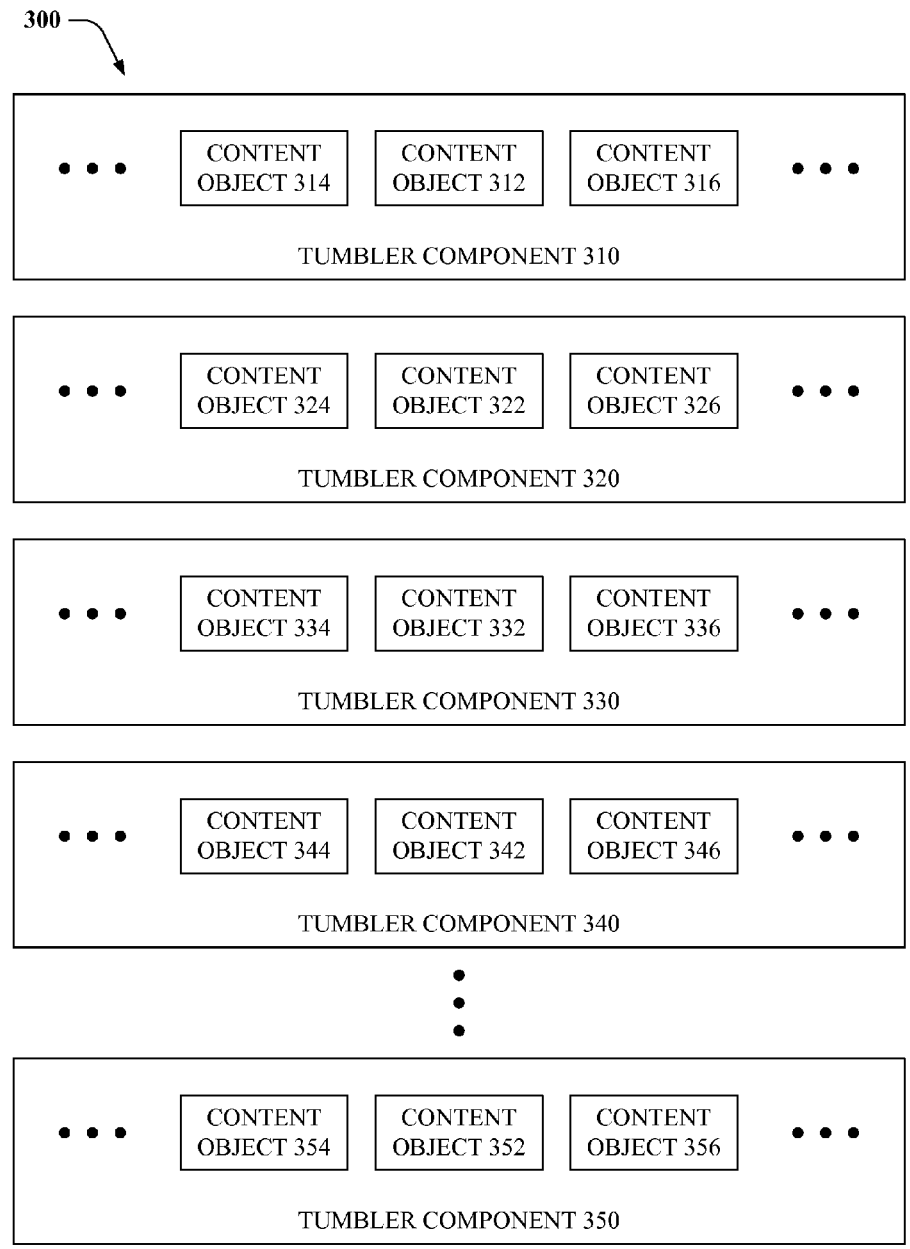
FIG. 3 depicts an exemplary vertical orientation of one possible exemplary system that facilitates employing a tumbler-style graphical user interface (TSGUI) in accord with aspects of the claimed subject matter.
Figure 4:
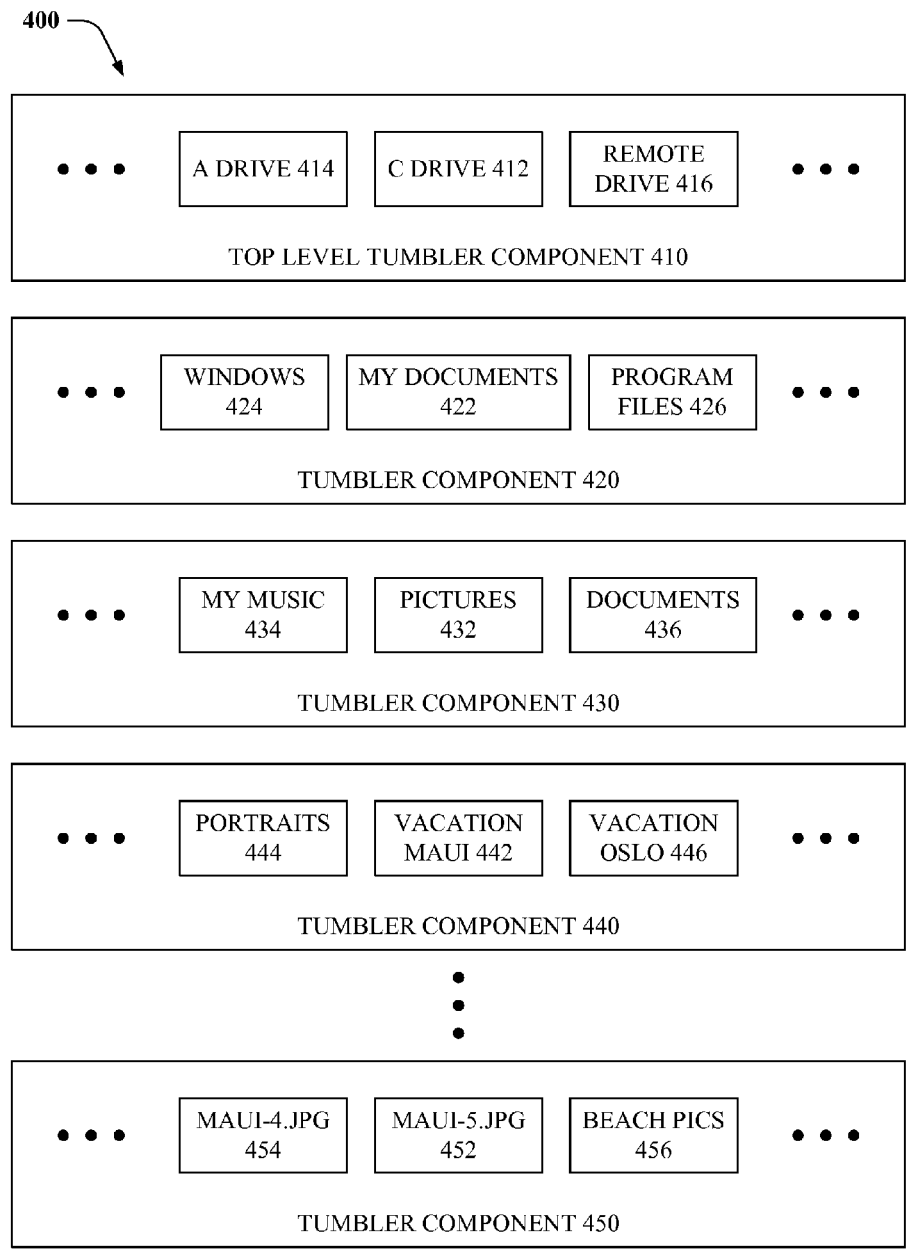
FIG. 4 depicts another exemplary vertical orientation of one possible exemplary system that facilitates employing a tumbler-style graphical user interface (TSGUI) in accord with aspects of the claimed subject matter.
Figure 5:
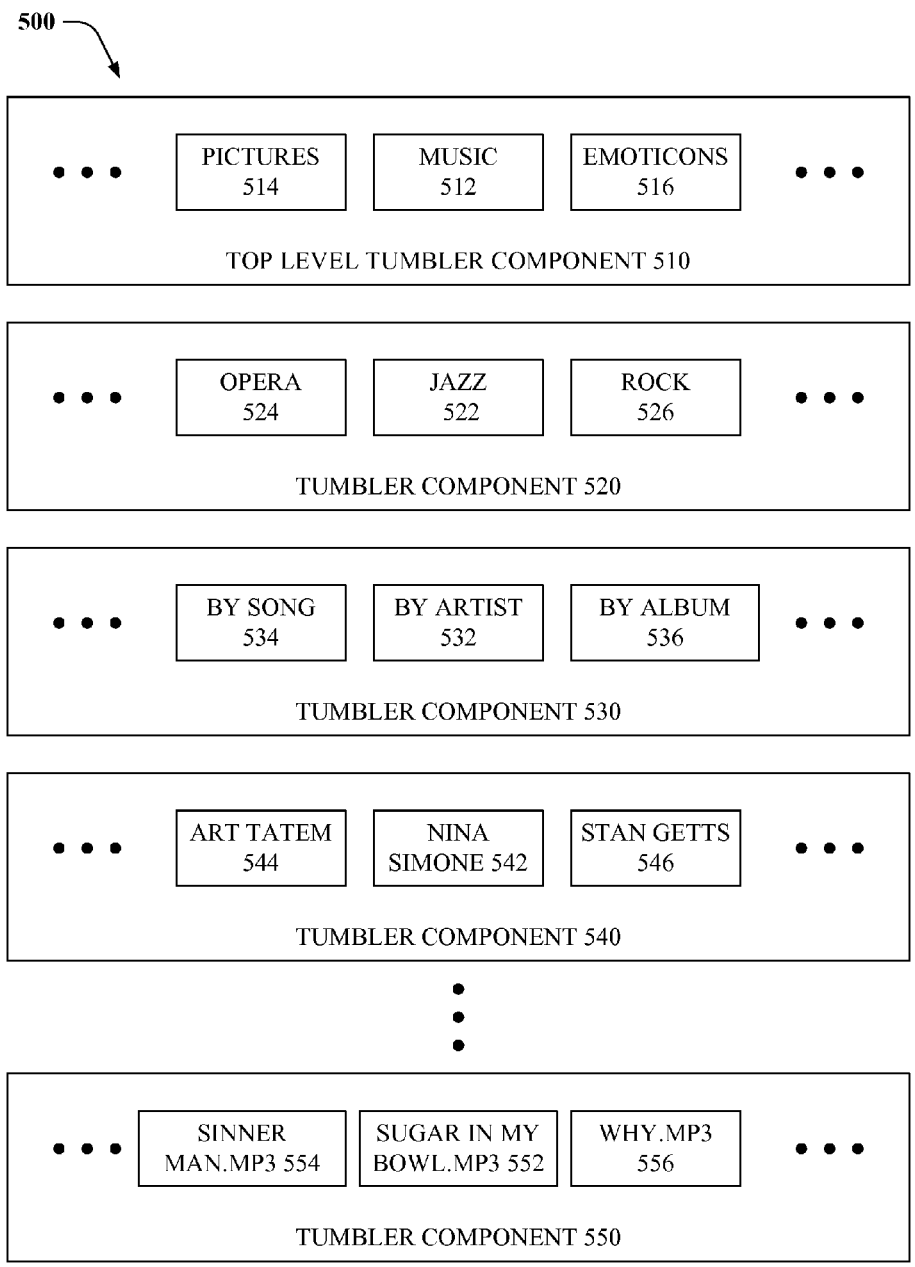
FIG. 5 depicts another exemplary vertical orientation of one possible exemplary system that facilitates employing a tumbler-style graphical user interface (TSGUI) in accord with aspects of the claimed subject matter.

FIGS. 3, 4, and 5 depict exemplary vertical orientations of possible exemplary systems that facilitate employing tumbler-style graphical user interfaces (TSGUI) in accord with the claimed subject matter. While, for purposes of simplicity of explanation, the systems are shown and described as a vertical series of tumbler components, it is to be understood and appreciated that the claimed subject matter is not limited by this particular orientation of tumbler components as disclosed herein. Moreover, not all illustrated tumbler components can be required to select a final information in accordance with the claimed subject matter. These particular exemplary systems can also serve as a framework on which to disclose further aspects of the current subject matter that is equally applicable to the other systems, devices, and methods disclosed herein. As such, aspects disclosed in relation to FIGS. 3, 4, and 5 are not so limited just these exemplary systems.

FIG. 3 illustrates an exemplary vertical orientation of one possible exemplary system 300 that facilitates employing a tumbler-style graphical user interface (TSGUI) in accord with aspects of the claimed subject matter. System 300 can include a vertical arrangement of at least a plurality of tumbler components 310-350. Each of the tumbler components of system 300 can include one or more content objects (312-316, 322-326, 332-336, 342-346 . . . 352-356). Content objects can be arranged horizontally within each tumbler component of system 300. One of skill in the art will appreciate that other arrangements within the vertical framework of system 300 are within the scope of the disclosed subject matter, for example, content objects can be in an M×N matrix within each vertically arrange tumbler component, etc.

In an aspect, selection of particular content objects of each tumbler component of system 300 can be by alignment. For example, FIG. 3 depicts content objects 312, 322, 332, 342 . . . 352 aligned at a particular position across tumbler components 310-350. This can be analogous to a mechanical combination lock wherein the combination is entered by aligning the tumbler markings to open the lock. This scheme as applied in a TSGUI can be familiar to users and can facilitate rapid acceptance of said TSGUI. Where alignment is employed as a selection mechanism for a TSGUI, the content objects can be moved in a horizontal direction within each of the tumbler components 310-350 to facilitate alignment across the plurality of tumbler components of system 300. For example, content object 316 can be moved left within tumbler component 310 (with content objects 314 and 312 similarly being leftwardly displaced and potentially moving beyond the displayed area of tumbler component 310). This leftward movement of content object 316 can bring 316 into alignment with content objects 322, 332, 342 . . . 352, and as such can provide a different "combination" for accessing a final content. One of skill in the art will appreciate that numerous other modalities for indicating a selection of a content object can be employed and that all such modalities are equally within the scope of the present disclosure, for instance, non-aligned content objects can be selectively "highlighted" by, for example, mouse-clicking, etc.

In a further aspect, it becomes apparent that where more senior tumbler component selections are indicated, more junior tumbler components can reflect, at least in part, a subset of content related to the selection within the more senior tumbler component. Moreover, where reselection can occur across the plurality of tumbler components, the subsets of content in tumbler components junior to the changed tumbler component can be altered. Thus, altering the senior selections can be done independent of altering the junior selections ("independent selection" schema), can be done independent of altering the junior selections dependant of the continuing validity of the junior selections ("validity dependant selection" schema), can be related to inferential alteration of junior selections ("inferential selection" schema), can be related to clearing one or more junior selections ("clearing children selection" schema), or some combination thereof. Further, while not disclosed in more detail herein, altering junior selections can be employed in remapping more senior tumbler component populations.

In an aspect, "independent selection" indicates that a junior information selection can be left unaltered when a senior information selection is altered (e.g., altering the senior selection can be an independent action from altering a junior selection). This can be particularly useful, for example, when the user wants to alter a plurality of senior tumbler component selections before changes to the junior tumbler information are reflected. In addition, where the same junior information is in fact valid under the altered senior selection, altering the senior tumbler selection can result in a valid path. For example, where a song has been performed by two different artists, changing the "artist tumbler" selection (e.g., a more senior tumbler component) from the first performer to the second performer without changing the "song title tumbler" selection (e.g., a more junior tumbler component) can result in valid access to the desired song without having to alter the more junior tumbler component selection.

In a further aspect, "validity dependant selection" indicates that a determination of validity for junior tumbler component content objects can be employed. In contrast, to independent selection relationships, a junior selection can be dependent on continuing validity in light of the alteration of the senior tumbler component selection. Thus, where a junior tumbler component content object is not valid under the reselected senior tumbler component, the selectable information in the junior tumbler component can be altered to be made valid (a new subset can be populated to select from) or removed (grayed-out, shaded, or otherwise indicated as an invalid selection information in relation to the alteration of the senior tumbler component selection). This is a highly intuitive embodiment in which junior tumbler components dynamically reflect alterations to more senior tumbler component selections.

In another aspect, "inferential selection" indicates that where senior tumbler component information selections are altered, the junior tumbler selections can be intelligently populated. This can be reflective of inferences related to the prior junior tumbler component selections. For example, a junior tumbler component content object may not be valid under a reselection in a senior tumbler component, but metadata can indicate that the junior content object was related to topic X such that when the senior selection is altered, the junior tumbler informations can be altered to intelligently reflect pre-selection of topic X related content objects in the junior tumbler component based at least in part on an inference related to the prior junior selection and/or the reselection of the senior selection.

In a still further aspect, a "clearing children" schema can simply truncate junior tumbler component populations to a single junior level below an altered senior reselection. Thus, where a senior tumbler selection is altered, one or more levels of junior tumbler selections can be cleared. Thus, for example, assume tumbler components 310-350 have selections indicated and reflecting subsets of content object 312. A user can reselect at tumbler component 310, for example from content object 312 to 314. Under a clearing children schema, the exemplary change can result in repopulation of tumbler component 320 with content objects reflecting, at least in part, a subset of informations related to newly selected content object 314 (compared to the prior content object 312) and tumbler components 330-350 can be cleared pending selection of an information from at least tumbler component 320.

One of skill in the art will appreciate that aspects of these various schemata can be combined to form other schemata and that all such schemata are within the scope of the subject disclosure. For instance, a clearing children schema can be combined with an inference schema. The resulting schema can, for example, clear all but one junior tumbler component but populate that tumbler component with content objects in an inferential manner based at least in part on the prior selections.

Moreover, one of skill in the art will appreciate that content objects as disclosed herein, and as disclosed elsewhere wherein, can be any representation facilitating access to a final information, and that all such content object representations are within the scope of the subject disclosure. As such, content objects can be filenames, thumbnails, images, directories, storage locations, phone numbers, IP addresses, passwords, categories, genera, etc.

Turning to FIG. 4, depicted is another exemplary vertical orientation of one possible exemplary system 400 that facilitates employing a tumbler-style graphical user interface (TSGUI) in accord with aspects of the claimed subject matter. System 400 can include a vertical arrangement of at least a plurality of tumbler components 410-450 which can be the same as, or similar to, tumbler components 310-350 of system 300. Similarly, each of the tumbler components of system 400 can include one or more content objects 412-416, 422-426, 432-436, 442-446 ... 452-456 which can be the same as, or similar to the content components of system 300.

FIG. 4 depicts system 400 as a simplistic example wherein a file is desired as a final information. As such, a file path can be defined to access this desired final information. Moreover, the file path can be but one of many possible file paths to access the desired final information residing in memory. One of skill in the art will appreciate that this example is given merely to better illuminate some of the aspects of the subject disclosure and should not be considered limiting in any manner. The file path can reflected in FIG. 4 can be: "C:\MyDocuments\Pictures\Vacation_Maui\ . . . \Maui.jpg".

System 400 can include a top level tumbler component 410 reflecting selection of content object 412 "C drive". At tumbler component 420, content object 422, "My Documents" can be selected. Similarly, content object 432, "Pictures" can be selected at tumbler component 430. Tumbler component 440 can indicate selection of content object 442 for the file "Vacation Maui". This can continue to further define additional portions of the file path to facilitate access to final information, "Maui-5.jpg", which information can be selected at tumbler component 450 by selecting content object 452 as a terminal information.

In an aspect, the content objects selected in exemplary system 400, as depicted, reflect portions of the file path to the desired final information (e.g., photo Maui-5.jpg) and need not be literal portions of the file path. For example, content object 412 can depict "C DRIVE" to represent the drive "C" and need not be depicted as "C:\\" or some other more traditional representation of the C drive in a file path depiction. This aspect is reflected in other selected content objects of system 400. The disclosed subject matter can, however, literally reflect portions of the file path where this is desirable.

In another aspect, system 400 illustrates the high context aspect of TSGUI as disclosed herein. It can be rapidly discerned that the final information is located within the disclosed path. Further, alteration of more senior tumblers of system 400 can facilitate rapid navigation along alternate paths where the desired final information is not located in the currently selected path.

In a further aspect, system 400 illustrates that mixed types of content objects can populate tumbler components. For example, content object 456 is a "file folder" type of content object representation. This can be contrasted with content objects 452 and 454 both of which are "image file" type content object representations. Moreover, content object 454, for example, can be represented with a thumbnail of image Maui-4.jpg rather than the textual representation of the same. This mixed representation facilitates rapid navigation to desired final informations and can facilitate novel representations of tree or node structures.

FIG. 5 depicts a further exemplary vertical orientation of one possible exemplary system 500 that facilitates employing a tumbler-style graphical user interface (TSGUI) in accord with aspects of the claimed subject matter. System 500 can be the same as or similar to system 400. The file path reflected in FIG. 4 can be:
"C: MyDocuments \Music \ByStyle\ByArtist\NinaSimone\ . . . \I_Want_A_Little_Sugar_In_My_Bowl.mp3".

System 500 can include a top level tumbler component 510 reflecting selection of content object 512 "Music". At tumbler component 520, content object 522, "Jazz" can be selected, indicating a genus selection. Similarly, content object 532, "by artist" can be selected at tumbler component 530. Tumbler component 540 can indicate selection of content object 542 for the file "Nina Simone". This can continue to further define additional portions of the file path to facilitate access to final information, "Sugar in my bowl.mp3", which information can be selected at tumbler component 550 by selecting content object 552 as a terminal information.

In an aspect, system 500 clearly illustrates an contrasting approach to accessing a final information than that disclosed for system 400. System 500 depicts path definition by class rather than by strictly defining a path in a serialized manner. Thus, rather than selecting "folder" as is conventional for file tree navigation, a user can select content objects representative of classes such as music, pictures, emoticons, etc., for example as depicted in tumbler component 510. For example, where "music" is selected at content object 512, this can represent a plurality of paths to accessible music files of a memory or other content store (e.g., content store component 130 of system 100). At content object 522 a subset of music can be selected, namely the Jazz genus, which can be a reflection of various subsets of the paths of the prior selection. This can proceed until a terminal selection can be made at selection component 552, for the song "I want a little sugar in my bowl" by Nina Simone. Merely stringing together the selections of the tumbler components of system 500 (e.g., "music jazz→by→artist→nina simone→ sugar in my bowl.mp3") results in a "path" that could not typically be directly traversed by most currently computing systems. However, this illustrates that the selections at the tumblers can be a representation of additional background computing. In this particular example, the "path" is more akin to a database query but in any case can result in facilitating user access to the desired song in memory.

In another aspect, the representations of the content objects can be abstracted to facilitate display in a limited display environment, for example on a mobile device such as a smart phone or personal digital assistant (PDA). Thus, where the exemplary song title is lengthy, variations can be employed to achieve an indication of a final selection from a user. This can include, displaying the entire file name (e.g., "I want a little sugar in my bowl—Nina Simone.mp3"). In an aspect, the full name can have a particular footprint. Where this footprint is undesirably large, the full name can be scrolled across a decreased footprint. Similarly, a truncated or compacted form of the name can be employed (e.g., " . . . [S]ugar in my bowl . . . Nina Simone.mp3", "I want . . . sugar . . . bowl", etc.) Also, an alternative representation can be employed, for instance, "most played, Nina Simone". One of skill in the art will appreciate that these and other techniques for communicating to a user the nature of the final selection can be employed alone or in combination and that all such techniques are within the overall scope of the present disclosure.

Figure 6:
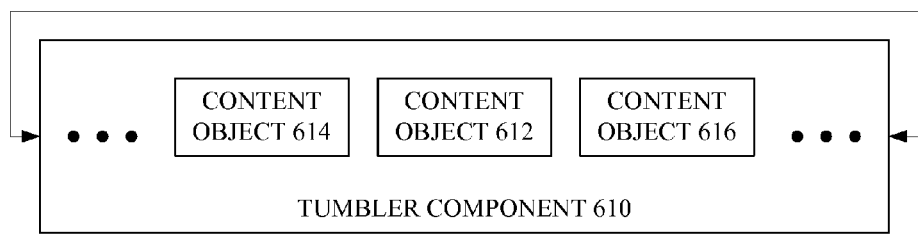
FIG. 6 illustrates exemplary systems that facilitates employing a tumbler-style graphical user interface (TSGUI) with and without cyclic traverse in accord with aspects of the claimed subject matter.
Figure 6:
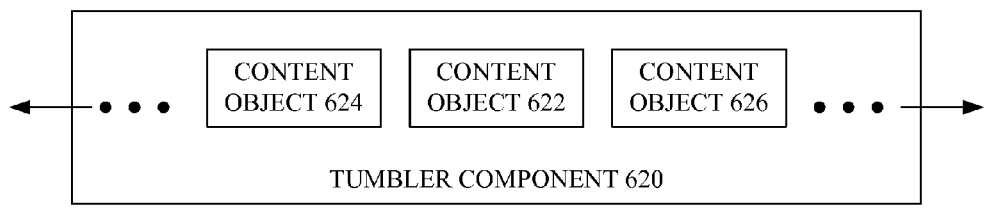

FIG. 6 illustrates exemplary systems 600 and 602 that facilitate employing a tumbler-style graphical user interface (TSGUI) with and without cyclic traverse in accord with aspects of the claimed subject matter. System 600 depicts a cyclic traverse of content objects of tumbler component 610. Thus, when traversing rightward of content object 616 (where 616 would otherwise be the rightmost content object) results in traversing to the content object 614 (where 614 is the leftmost object). Alternatively, the objects of the tumbler component 610 can appear to rotate such that content object 616 is followed by 614. By analogy, where a mechanical tumbler represents the numbers 0 to 9, the tumbler traverses seamlessly from 9 to 0 as the tumbler is rotated within the lock.

In contrast, system 602 depicts a linear or sequential population of tumbler component 620. In system, 602 there is a right and left terminal content object. Attempting to traverse beyond the extents of the list does not return the user to the beginning of the list as in a cyclic traverse (see system 600). By analogy, system 602 is similar to a volume slider or volume knob wherein the volume can range between 0 and 10 but does not permit adjusting the volume above 10 or below 0 or to cyclically return to 0 from maximum volume or conversely to directly reach maximum volume from silence without traversing the intermediate volume levels.

In a further aspect, either cyclical or linear scrolling can be associated with accelerated scrolling. Accelerated scrolling allows rapid traverse of content objects of a tumbler component. As an example, scrolling can scroll by object, by a predetermined number of objects, or by percentage of total objects, etc., or combinations thereof. For example, where five content objects are displayed in the visible area of a tumbler component, scrolling can be by three objects at a time, such that object 4 moves to object 1's position object 5 moves to object 2's position, etc. for a first scroll step. At a second scroll step, object 8 would move to object 4's position, etc. (e.g., the $4^{th}$ position again moves to the $1^{st}$ position, . . . ) Similarly, some other predetermined number of objects or a percentage of total objects can be used to accelerate scrolling through large volumes of content objects of a tumbler. These techniques can be combined to facilitate dynamic acceleration such that an initially a scroll can be slower, then accelerate to a second pace, then accelerate again to a more accelerated pace, and so on until the user can scroll through the content objects at the desired speed. Similarly, deceleration can employ these same techniques to step down accelerated scroll to a more meaningful scroll speed for a user.

Figure 7:
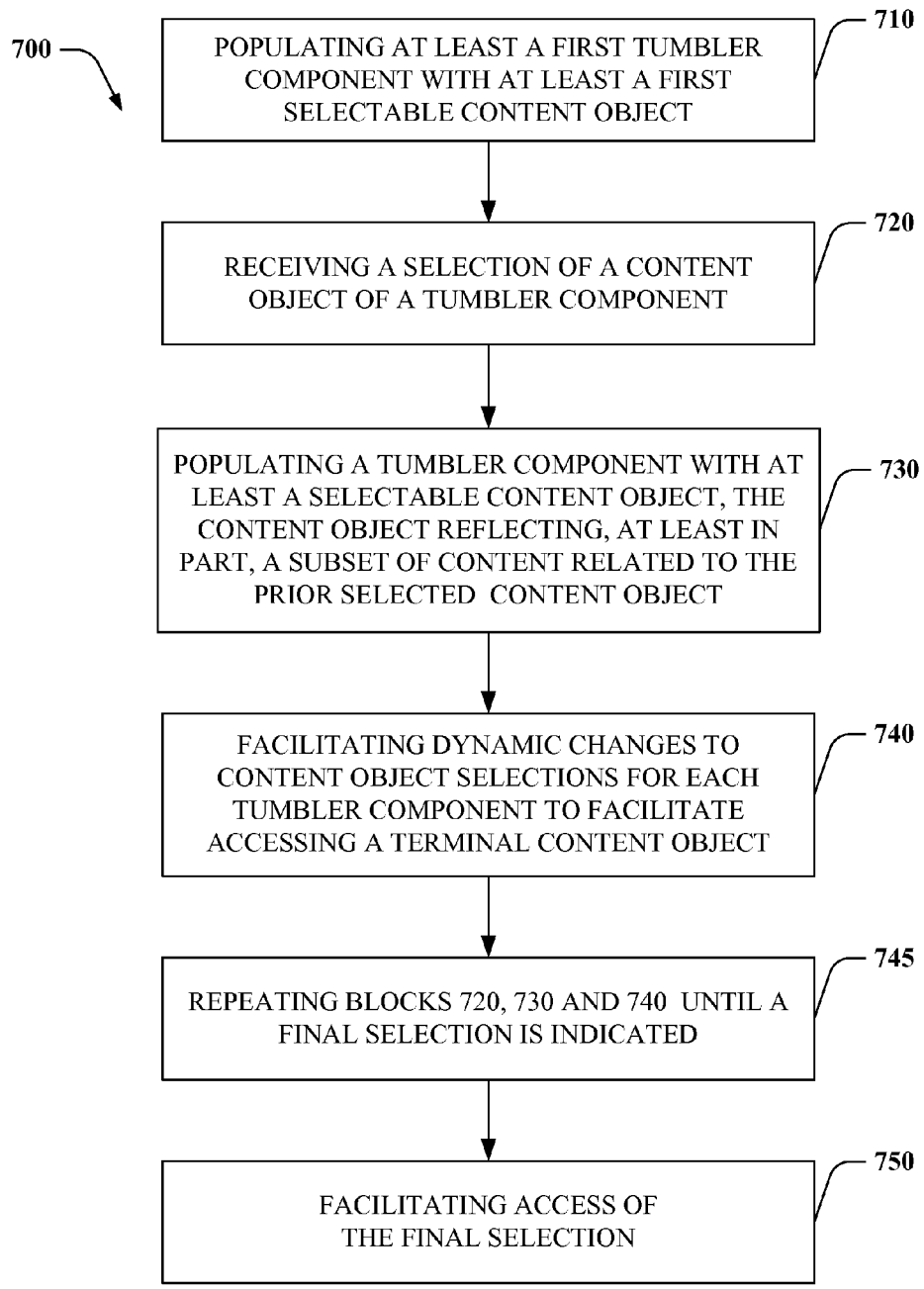
FIG. 7 depicts an exemplary method that facilitates employing a tumbler-style graphical user interface (TSGUI) in accord with aspects of the claimed subject matter.
Figure 8:
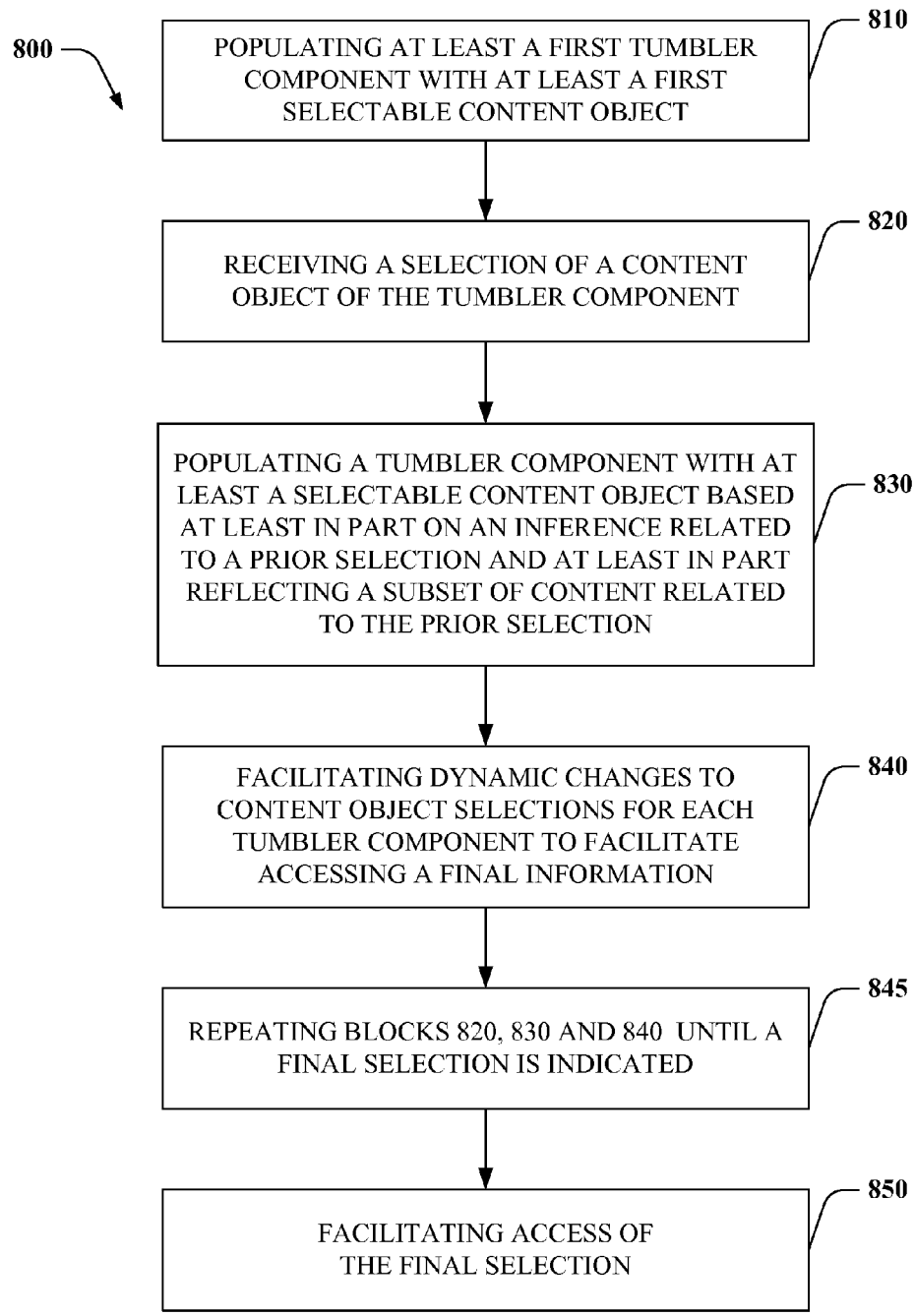
FIG. 8 illustrates an exemplary method that facilitates employing a tumbler-style graphical user interface (TSGUI) in accord with aspects of the claimed subject matter.

FIGS. 7 and 8 depict exemplary methodologies in accord with the claimed subject matter. While, for purposes of simplicity of explanation, the methodologies are shown and described as a series of acts, it is to be understood and appreciated that the claimed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers.

FIG. 7 depicts an exemplary methodology 700 that facilitates employing a tumbler-style graphical user interface (TS-GUI) in accord with aspects of the claimed subject matter. At 710, a first tumbler component can be populated with at least a selectable content object. At 720, system 700 can receive a selection of a content object of a tumbler component. In the first pass through block 720, the selection can relate to the population of content object(s) of the first tumbler component.

At 730, a second tumbler component can be populated with at least a selectable content object. The at least a content object of the second tumbler component reflecting, at least in part, a subset of content related to the prior selected content object. In a non-limiting example, where the first tumbler is populated with drive letter content objects at 710, of which the C-drive is selected at 720, at 730 the second tumbler component can be populated with content objects representing the subfolders of the selected C-drive.

At 740, system 700 facilitates dynamic changes to the selected content objects of tumbler components facilitating access to a terminal content object. For instance, system 700 can facilitate receiving an indication of a changed selection for the first tumbler component selection. Continuing the above example, an indication can be received at 740 that a user has selected the A-drive at the first tumbler, replacing the selection of the C-drive originally received at 720.

At 745, where a final selection has not occurred (e.g., an indication of a terminal content object has not be received as disclosed herein), blocks 720, 730 and 740 can be repeated. This can include populating additional tumbler components and/or repopulating existing tumbler component populations as disclosed herein (e.g., by "independent selection", "validity dependant selection", "inferential selection", "clearing children selection", . . . ).

Where a terminal content object has been indicated, system 700 can facilitate accessing the final selection at 750. For example, where system 700 has received indications across a plurality of tumblers for a file path to a web page, receiving a terminal selection indication of the indicated web page can, at least in part, cause the indicated web page to be displayed to a user of a system employing methodology 700. Similarly, where methodology 700 is employed in a "texting" environment, for example on a mobile device such as a smartphone, indications of "emoticons smileyfaces bigsmile" can, at least in part, cause a "bigsmile" emoticon to be entered inline into a text message being composed by the user.

At this point methodology 700 can end. One of skill in the art will appreciate that system 700 can support many of the aspects of the related systems disclosed herein even where those aspects are not directly and expressly illustrated in relation to the exemplary methodologies and that such aspects are contemplated to be within the scope of the present disclosure.

FIG. 8 illustrates an exemplary methodology 800 that facilitates employing a tumbler-style graphical user interface (TSGUI) in accord with aspects of the claimed subject matter. At 810, a first tumbler component can be populated with at least a selectable content object. At 820, a selection of a content object of a tumbler component can be received. At 830, a tumbler component can be populated with at least a selectable content object. This can include consideration of inferences related to selection indications.

The at least a content object, at 830, of the tumbler component reflects, at least in part, a subset of content related to the prior selected content object and can be similar to block 730 of methodology 700. However, in contrast to block 730, block 830 further incorporates a reflection of an inference at least in part related to a prior selection within system 800. The inference can, for example, be related to naming content objects for display to a user based on inferences relating to prior user selections of content. As another example, where a user regularly selects a particular spreadsheet file, the content objects population can be skewed to the regularly selected file (e.g., sorted for rapid access to the file, using a highlight around the regularly selected file, etc.) based on an inference that the user is seeking this same file based on the historic selections of this file, presuming that file is also reflected as a subset of the received selection at 820.

At 840, system 800 facilitates dynamic changes to the selected content objects of tumbler components facilitating access to a terminal content object. For instance, system 800 can facilitate receiving an indication of a changed selection for the first tumbler component selection. At 845, where a final selection has not occurred, blocks 820, 830 and 840 can be repeated. This can include populating additional tumbler components and/or repopulating existing tumbler component populations as disclosed herein (e.g., by "independent selection", "validity dependant selection", "inferential selection", "clearing children selection", . . . ). Where a terminal content object has been indicated, system 800 can facilitate accessing the final selection at 850. At this point methodology 800 can end.

One of skill in the art will appreciate that system 800 can support many of the aspects of the related systems disclosed herein even where those aspects are not directly and expressly illustrated in relation to the exemplary methodologies and that such aspects are contemplated to be within the scope of the present disclosure. Further, it will be appreciated that inferences (e.g., employing artificial intelligence) into populating tumbler components with content objects can be a powerful tool that can leverage the high level of context available to user's of devices employing methodology 800. Numerous diverse examples can be developed illustrating the use of inferences in populating tumbler components and all such examples are considered directly in the scope of the current disclosure.

For example, a series of tumblers can be populated toward finding a photo of a user's child on a climbing trip. A first series of tumbler selection can include selections that relate to vacations, climbing, and images of the child. Where the desired final information is not located the user can rapidly reselect a senior tumbler selection given that the user has a high level of context when using a TSGUI. The reselection can, at least in part, cause repopulation of the more junior tumbler components. This population can employ inference to populate the junior tumblers with content objects that can be similarly related and can facilitate the user more rapidly finding the desired photo. These inferences can be based, at least in part, on the prior selections relating to vacations, climbing, and images of the child. In one particular embodiment, a content object such as "suggested images" can be included in the first tumbler junior to the senior tumbler containing the changed selection indication. This example is of course intended to be non-limiting and is presented only to illustrate applied aspects of the disclosed methodology.

Figure 9:
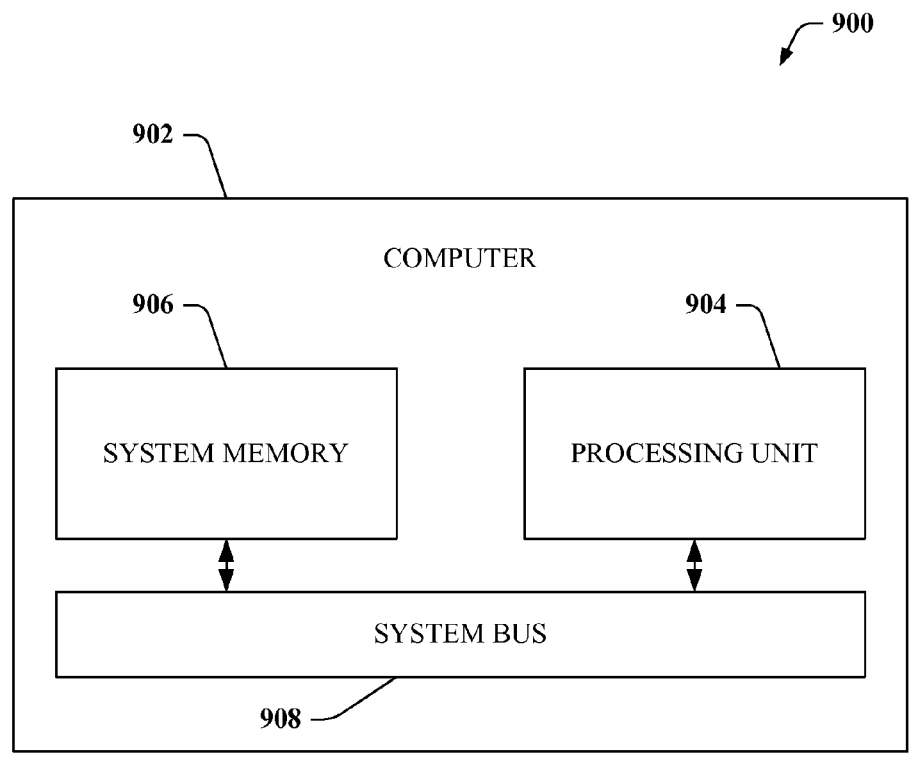
FIG. 9 illustrates a sample operating environment that can determine and store information related to a missed call in accord with aspects of the claimed subject matter.

In order to provide additional context for various aspects of the claimed subject matter, FIG. 9 and the following discussion are intended to provide a brief, general description of a suitable computing environment 900 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors, such a single core processor, a multi-core processor, or any other suitable arrangement of processors. The system bus 908 can be any of several types of bus structure that can further interconnect to a memory bus (with or without a memory controller), a peripheral bus, and a local bus using any of a variety of commercially available bus architectures. The system memory 906 can include read-only memory (ROM), random access memory (RAM), high-speed RAM (such as static RAM), EPROM, EEPROM, and/or the like. Additionally or alternatively, the computer 902 can include a hard disk drive, upon which program instructions, data, and the like can be retained. Moreover, removable data storage can be associated with the computer 902. Hard disk drives, removable media, computer-readable storage media, etc. can be communicatively coupled to the processing unit 904 by way of the system bus 908.

The system memory 906 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 902 through one or more wired/wireless input devices, such as a keyboard, pointing and clicking mechanism, pressure sensitive screen, microphone, joystick, stylus pen, etc. A monitor or other type of interface can also be connected to the system bus 908.

The computer 902 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 902 can connect to other devices/networks by way of antenna, port, network interface adaptor, wireless access point, modem, and/or the like.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
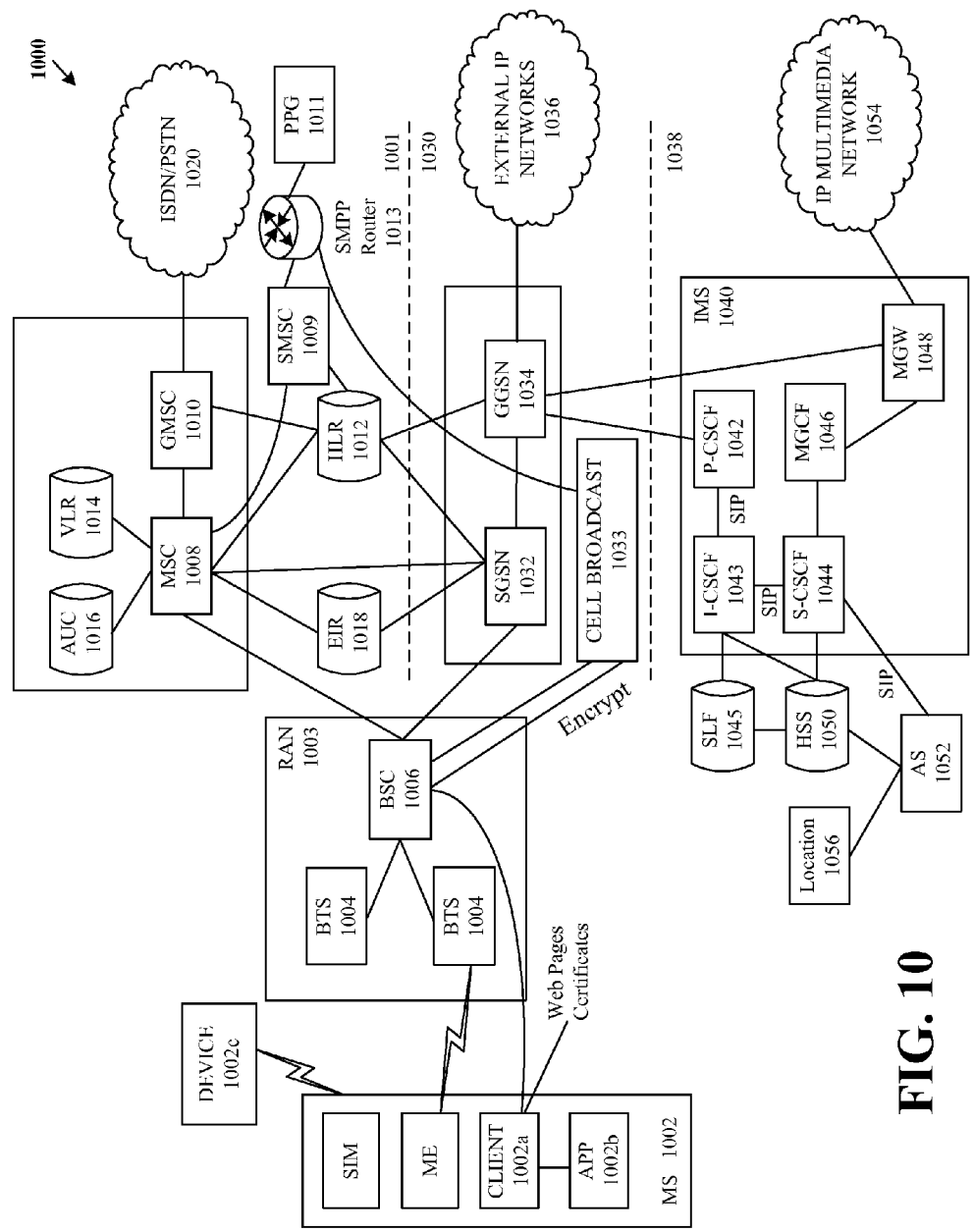
FIG. 10 depicts a sample network-environment for effectuating mobile communication in accord with aspects of the subject innovation.

Now turning to FIG. 10, such figure depicts a GSM/GPRS/IP multimedia network architecture 1000 that includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1002 includes an embedded client 1002a that receives and processes messages received by the MS 1002. The embedded client 1002a can be implemented in JAVA and is discuss more fully below.

The embedded client 1002a communicates with an application 1002b that provides services and/or information to an end user. One example of the application can be navigation software that provides near real-time traffic information that is received via the embedded client 1002a to the end user. The navigation software can provide road conditions, suggest alternate routes, etc. based on the location of the MS 1002. Those of ordinary skill in the art understand that there are many different methods and systems of locating an MS 1002.

Alternatively, the MS 1002 and a device 1002c can be enabled to communicate via a short-range wireless communication link, such as BLUETOOTH. For example, a BLUETOOTH SIM Access Profile can be provided in an automobile (e.g., device 1002c) that communicates with the SIM in the MS 1002 to enable the automobile's communications system to pull information from the MS 1002. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1002c. There can be an endless number of devices 1002c that use the SIM within the MS 1002 to provide services, information, data, audio, video, etc. to end users.

The BTS 1004 is physical equipment, such as a radio tower, that enables a radio interface to communicate with the MS. Each BTS can serve more than one MS. The BSC 1006 manages radio resources, including the BTS. The BSC can be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vise versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 can be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 can also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 can contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile device, comprising:
   a processor; and
   a memory that stores executable instructions that, when executed by the processor, facilitate performance of operations, comprising:
      subsequent to populating a child tumbler of a hierarchical presentation with a first set of first child objects, receiving input data that selects a first child object from the first set of first child objects, wherein the child tumbler is populated based on a selection of a first parent object displayed within a parent tumbler of the hierarchical presentation,
      in response to determining that the first parent object has been updated to a second parent object in the parent tumbler and based on metadata associated with the first child object, repopulating the child tumbler with a second set of second child objects,
      facilitating a display of the second parent object and a second child object that is determined to be selected from the second set of second child objects along a common axis, and
      in response to determining that information representing a relationship between the second parent object and the second child object satisfies a validity criterion, facilitating a transmission of the second child object via a cross-platform messaging application of the mobile device.

2. The mobile device of claim 1, wherein the metadata is first metadata and the operations further comprise:
   organizing the second set of second child objects based on second metadata associated with the second set of second child objects.

3. The mobile device of claim 1, wherein the operations further comprise:
   organizing the second set of second child objects based on temporal data associated with the second set of second child objects.

4. The mobile device of claim 1, wherein the operations further comprise:
   organizing the second set of second child objects alphabetically.

5. The mobile device of claim 1, wherein the facilitating the display comprises facilitating the display based on a characteristic of a display area of the mobile device.

6. The mobile device of claim 1, wherein the operations further comprise:
   inserting the second child object into a text message of the cross-platform messaging application.

7. The mobile device of claim 1, wherein the facilitating the display comprises highlighting the second child object based on historical data.

8. The mobile device of claim 1, wherein the operations further comprise:
   in response to determining that the information does not satisfy the validity criterion, facilitating rendering of notification data that indicates that the validity criterion has not been satisfied.

9. The mobile device of claim 1, wherein the operations further comprise:
   in response to determining that the second parent object has been updated to a third parent object in the parent tumbler, deleting the second set of second child objects from the child tumbler.

10. The mobile device of claim 1, wherein the cross-platform messaging application utilizes disparate messaging protocols to facilitate the transmission.

11. A method, comprising:
    based on a selection of a first parent object displayed within a parent tumbler of a hierarchical presentation, populating, by a mobile device comprising a processor, a child tumbler of the hierarchical presentation with a first set of first child objects;
    in response to determining that the first parent object has been changed to a second parent object in the parent tumbler and based on metadata associated with a first child object that is determined to be selected from the first set of first child objects, repopulating, by the mobile device, the child tumbler with a second set of second child objects;
    facilitating, by the mobile device, an alignment of the second parent object and a second child object that is determined to be selected from the second set of second child objects along a common axis; and
    in response to determining that information representing an association between the second parent object and the second child object satisfies a validity criterion, facilitating, by the mobile device, a transmission of the second child object via disparate messaging protocols.

12. The method of claim 11, further comprising:
    organizing, by the mobile device, the second set of second child objects based on classification data associated with the second set of second child objects.

13. The method of claim 11, further comprising:
    organizing, by the mobile device, the second set of second child objects based on timing data associated with the second set of second child objects.

14. The method of claim 11, further comprising:
    organizing, by the mobile device, the second set of second child objects based on size data associated with the second set of second child objects.

15. The method of claim 11, further comprising:
    inserting, by the mobile device, the second child object into a text message determined by a cross-platform messaging application of the mobile device.

16. The method of claim 11, further comprising:
in response to determining that the information does not satisfy the validity criterion, facilitating, by the mobile device, a rendering of notification data that indicates that the validity criterion has not been satisfied.

17. A computer-readable storage device comprising executable instructions that, in response to execution, cause a mobile device comprising a processor, to perform operations, comprising:
based a first parent object being selected from parent objects within a parent tumbler of a hierarchical presentation, populating a child tumbler of the hierarchical presentation with a first set of first child objects;
receiving input data that selects a first child object from the first set of first child objects;
in response to determining that the first parent object has been updated to a second parent object of the parent objects and based on metadata associated with the first child object, populating the child tumbler with a second set of second child objects;
facilitating a display of the second parent object and a second child object that is determined to be selected from the second set of second child objects along a common axis; and
in response to determining that information representing a relationship between the second parent object and the second child object satisfies a validity criterion, facilitating a transmission of the second child object via a cross-platform messaging application of the mobile device.

18. The computer-readable storage device of claim 17, wherein the second child object represents a protocol.

19. The computer-readable storage device of claim 17, wherein the operations further comprise:
based on historical data, highlighting a subset of the second set of second child objects.

20. The computer-readable storage device of claim 17, wherein the facilitating the transmission comprises facilitating the transmission via disparate messaging protocols.

* * * * *